Nov. 26, 1940.  R. W. GEORGE  2,223,172

TUBE MOUNTING AND BY PASS CONDENSER

Filed Nov. 16, 1937

INVENTOR.
RALPH W. GEORGE
BY
H. S. Grover
ATTORNEY.

Patented Nov. 26, 1940

2,223,172

UNITED STATES PATENT OFFICE 2,223,172

TUBE MOUNTING AND BY-PASS CONDENSER

Ralph W. George, Riverhead, N. Y., assignor to Radio Corporation of America, a corporation of Delaware Application November 16, 1937, Serial No. 174,749

8 Claims. (Cl. 175—41)

This invention relates to a new and novel ultra high frequency tube mounting and bypass condenser means, and is particularly adapted to the mounting of a thermionic tube used in ultra high frequency circuits in the order of thirty megacycles and upwards where it is necessary to bypass certain circuit elements effectively with a minimum of inductance added to the circuit by the by-passing condenser.

An object of this invention is to simplify and improve the tube mounting and by-passing of high frequency tubes which are known in the trade as type 954 and type 955.

Another object of this invention is to provide a new and novel small low capacity electrostatic condenser wherein the lower portion is provided with a tube mounting stud and the upper portion with a clip for receiving standard tubes used in ultra high frequency circuits, or if desired the clips may be used for mounting other circuit elements, such as plug-in coils.

Still another object of this invention is to provide radio frequency grounding of ultra high frequency tubes by means of capacitors which are placed closed to the tube terminals in order to obtain a short, low impedance radio frequency path to ground and a high percent of efficiency.

A feature of this invention is that with this new and novel type of tube mounting, more effective bypassing means are provided as the mounting and bypassing capacitor means are incorported in a single compact unit.

Another feature of this invention is that the unit eliminates the usual insulated socket which is generally provided to support the tube clips and therefore it requires less space for the tube mounting and bypass capacitors.

Still another feature is that faulty clips or bypass capacitors may be easily replaced by new units.

Furthermore, by the use of this tube mounting means and with the elimination of the usual socket mounting, certain tube leads may be more directly grounded by the use of a metal block in place of the capacitors.

In the use of ultra high frequency tubes known as Acorn types 954 and 955, it is necessary to provide a low inductance bypass capacitor for the heater, cathode, screen and suppressor leads. By means of this invention, this need is answered by incorporating with a small capacitor a mounting stud, a capacitor stack and a tube clip.

This invention consists of the construction and arrangement herein described, claimed and shown in the accompanying drawing, in which:

Figure 1:
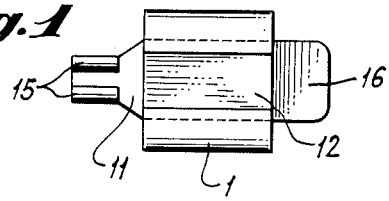
Fig. 1 is a plan view of the tube mounting and bypass capacitor means.
Figure 2:
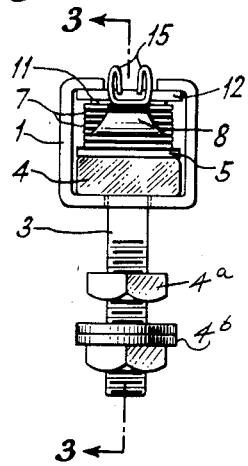
Fig. 2 is an end view of Fig. 1.
Figure 3:
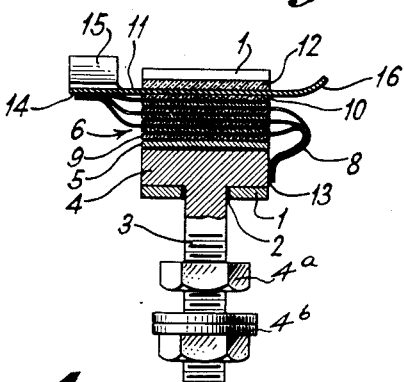
Fig. 3 is a section of Fig. 2.
Figure 4:
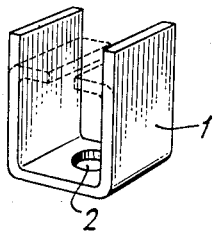
Fig. 4 is a detail of the capacitor clamp.

Referring now in detail to Figs. 1, 2, 3 and 4, there is provided a metallic clamp 1 which is made of any suitable material, such as brass or phosphor bronze, steel or the like. The clamp has located in place an aperture 2 through which passes a terminal stud 3 having a square or rectangular thick plate portion 4 and provided with suitable nuts 4a and washers 4b. Located on the top of thick plate portion 4 of terminal stud 3 is a clamp plate 5 which may, if desired, be of spring material to provide suitable tension upon the capacitor stack 6 which may consist of alternately arranged sheets of mica 7 and foils 8, the end faces of the stack being covered with mica separators 9 and 10, over one of the mica separators 10 a terminal clip 11 is placed. To provide insulation between the clip 11 and clamp 1, a comparatively thick insulation member 12 is placed. Over member 12 is bent the ends of clamp 1. The foils are preferably narrower than the mica dielectric sheets, but are longer, and successively laid foils are arranged to project from opposite ends of the stack in bunches so as to connect them together in parallel. One side of the foil bunches is soldered at a point 13 to the side of plate portion 4 of terminal stud 3 near the bottom of clamp 1, the other side of the foil bunches being soldered to the underside of clip 11 at point 14. Clip 11 is bent over at one end at 15 to provide for the mounting of the tube leads. It will be noted that the thick plate portion 4 is of greater thickness than that of clamp 1, therefore, the plate portion will serve as a bearing plate to maintain the mica and foil sheets substantially flat when clamp 1 is bent over. In order that connection between the tube clip 11 and the voltage supply may be soldered without having resin or solder flowing onto the clip proper, the clip is isolated from the condenser stack by being preferably bent upwardly at 16 and dipped in molten tin to provide a coated surface, to which external circuit wires may be readily secured. As an alternative form of construction, the clamp 1 may be made shorter and the aperture 2 eliminated, the lower portion of clamp 1 being soldered directly to 4 on stud 3.

Figure 5:
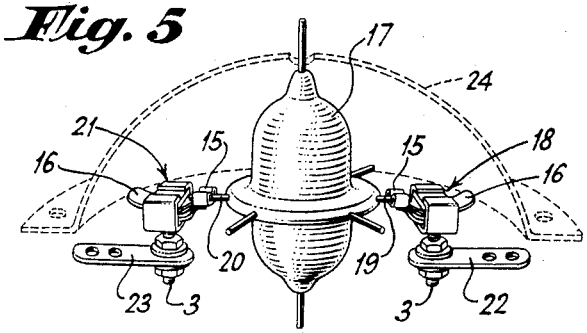
Fig. 5 is a perspective view of an Acorn type tube showing how the mounting means provides support of the tube to suitable mounting members.

Referring now to Fig. 5, 17 indicates the Acorn tube having a screen grid lead 19 to which is secured a bypass capacitor unit 18. Directly opposite lead 19 is a cathode lead 20 which is provided with another tube mounting and bypass condenser element 21. The studs 3 of elements 18 and 21 pass through an aperture in mounting members 22 and 23. It will be seen that by providing this improved unit, the length of the tube lead to the capacitor is extremely short. The inductance of the capacitor is kept low by its small size and the small number of plates, also the grounded terminal has a low inductance because it is short and soldered directly to the clamp of the capacitor, which is immediately grounded by mounting screw 3. By mounting stud 3 of these improved units on a metal common ground plate, not shown, a spherical metal shield shown by the broken lines can be built onto the ground plate to most effectively shield the Acorn tube. Obviously, this improved unit can also be used to mount and bypass any vacuum tube element terminals other than the Acorn type of tube by suitably modifying the clip 15 or mounting means or if desired, the unit may be used for mounting and bypassing any form of plug-in coils to which suitable stiff leads are provided for connections to clip 11. Furthermore, this invention should not be limited to the identical construction shown as it is capable of taking other forms and should only be limited to such limitations as are clearly imposed in the appended claims.

What is claimed is:

1. An electric capacitor comprising a mica and foil capacitor stack, a U-shaped metallic clamp surrounding said stack, an insulating member interposed between one end of said stack and said clamp, a terminal stud having a thick plate portion to act as a bearing plate for said stack and substantially filling the inside of said U-shaped metallic clamp not occupied by said capacitor stack, said stud secured to the lower portion of said clamp for connecting said stack to an external circuit, and a clip located at the upper portion of said stack, one side of said stack being connected to the clip, the other side of said stack being connected to the plate portion of said stud.

2. An electric capacitor comprising mica sheets and parallel connected foils forming a capacitor stack, a metallic clamp surrounding said stack, an insulating member interposed between one end of said stack and said clamp, a terminal stud having a rectilinear thick plate portion to act as a bearing plate for said stack, said threaded stud secured to and passing through the lower portion of said clamp, and a clip located at the upper portion of said stack for connecting said stack to an external circuit, one side of said stack being connected to the clip, the other side of said stack being connected to said stud.

3. An electric capacitor comprising a mica and foil capacitor stack, a metallic band clamp surrounding said stack, an aperture in the base of said clamp, a stud having a rectilinear head located on the lower portion of said clamp, said stud passing through the aperture in the base of said clamp, an insulating member interposed between one end of said stack and the upper portion of said band clamp, and a clip located in the upper portion of said stack directly beneath said insulating member, one side of said stack being connected to said clip, the other side of said stack being connected to the side of the rectilinear head of said stud.

4. An electric capacitor comprising mica sheets and parallel connected foils forming a capacitor stack, a metallic band clamp surrounding said stack, an aperture in the base of said clamp, a threaded stud having a rectilinear head located on the lower portion of said clamp, said stud passing through the aperture in the base of said clamp, an insulating member interposed between one end of said stack and said clamp, and a terminal strip located at the upper portion of said stack and extending outward on each side of said stack beyond the confines of said clamp, one side of said stack being connected to said clip, the other side of said stack being connected to said stud.

5. An electric capacitor comprising a capacitor stack of alternately arranged mica and foil sheets, a U-shaped metallic clamp having an aperture therein, said clamp being substantially as wide as said mica sheets and surrounding said stack, a terminal stud having a thick plate portion to act as a bearing plate for said stack, said stud located on the lower portion of said clamp and passing through the aperture therein, an insulating member interposed between one end of said stack and the upper portion of said clamp, a terminal strip located in the upper portion of said stack and extending each side of said clamp, one of the extending portions forming a clip, the other forming a terminal connection tab of the condenser, the open ends of said clamp being bent over to bind said insulating member, mica and foil sheets, and said terminal strip mechanically together, one side of said stack being connected to the clip side of said terminal strip, the other side of said stack being connected to the plate portion of said terminal stud.

6. An electric capacitor comprising a capacitor stack of alternately arranged mica and foil sheets, a U-shaped metallic clamp having an aperture therein, said clamp being substantially as wide as said mica sheets and surrounding said stack, a square headed terminal stud having a thick plate portion to act as a bearing plate for said stack, said stud located on the lower portion of said clamp and passing through the aperture therein, an insulating member interposed between one end of said stack and the upper portion of said clamp, a terminal strip located in the upper portion of said stack and extending each side of said clamp, one of the extending portions forming a clip, the other forming a terminal connection tab of the condenser, the open ends of said clamp being bent over to bind said insulating member, mica and foil sheets, and said terminal strip mechanically together, one side of said stack being connected to the clip side of said terminal strip, the other side of said stack being connected to the square headed portion of said terminal stud.

7. An electric capacitor comprising a mica and foil capacitor stack, a U-shaped metallic clamp having an aperture therein, said clamp surrounding the top, bottom and two sides of said stack, a terminal strip extending outward each side of said stack, one end of said strip being provided with a clip for connecting with a terminal of a vacuum tube, the other end of said strip provided with a tab for external connection, a square headed stud having a thick plate portion to act as a bearing plate for said stack, said stud secured to the lower portion of said clamp and passing through the aperture therein, the sides of the head on said terminal stud being substantially equal to the interior width of said U-shaped clamp, said terminal strip located in the upper portion of said stack, the open ends of said clamp being bent over to bind said stack and terminal strip mechanically together, one side of said stack being connected to said strip, the other side of said stack being connected to the square headed portion of said terminal stud.

8. An electric capacitor comprising a mica and foil capacitor stack, a U-shaped metallic clamp having an aperture therein, said clamp surrounding said stack, a terminal stud having a thick plate portion which is of greater thickness than the thickness of said clamp, said plate portion acting as a bearing plate for said stack, said stud secured to the lower portion of said clamp and passing through the aperture therein, a terminal strip extending outward on each side of said stack, one end of said strip having a U-shaped clamp, the other end having a contact tab for external connection of said condenser, an insulating member interposed between one end of said stack and said clamp, the open ends of said clamp being bound over to bind said insulating member, mica and foil capacitor stack and said strip mechanically together, one side of said stack being connected to said strip, the other side of said stack being connected to the plate portion of said stud.

RALPH W. GEORGE.